United States Patent [19]

Mor et al.

[11] Patent Number: 4,905,178

[45] Date of Patent: Feb. 27, 1990

[54] FAST SHIFTER METHOD AND STRUCTURE

[75] Inventors: Yeshayahu Mor, Cupertino, Calif.; Yeshayahu Schatzberger, Haifa, Israel; Leonardo Sandman, Cupertino, Calif.

[73] Assignee: Performance Semiconductor Corporation, Sunnyvale, Calif.

[21] Appl. No.: 909,521

[22] Filed: Sep. 19, 1986

[51] Int. Cl.$^4$ .............................................. G06F 7/38
[52] U.S. Cl. .................................. 364/748; 364/715.04
[58] Field of Search ........ 364/748, 736, 200 MS File, 364/900 MS File, 715, 715.04, 715.08

[56] References Cited

U.S. PATENT DOCUMENTS

| | | | |
|---|---|---|---|
| 3,810,115 | 5/1974 | Stafford | 364/715.08 |
| 4,208,722 | 6/1980 | Rasala et al. | 364/748 |
| 4,472,788 | 9/1984 | Yamazaki | 364/715 |
| 4,475,173 | 10/1984 | Talmi | 364/715 |
| 4,509,144 | 4/1985 | Palmer et al. | 364/715.08 |
| 4,528,640 | 7/1985 | Criswell | 364/748 |
| 4,639,886 | 1/1987 | Hashimoto et al. | 364/736 |

FOREIGN PATENT DOCUMENTS 1438307 12/1973 United Kingdom .

Primary Examiner—David L. Clark
Assistant Examiner—Long T. Nguyen
Attorney, Agent, or Firm—Skjerven, Morrill, MacPherson, Franklin & Friel

[57] ABSTRACT

Normalization and scaling operations are performed by the use of the fast shifter of a micrprocessor operating in response to the system clock, rather than in response to microinstructions. By local control of the fast shifter, multiple shift steps essential to normalization and scaling operations are performed at a much faster rate than possible in the prior art wherein each bit shift must be controlled by a single microinstruction, and without the heavy cost in integrated circuit chip area that a barrel shifter requires. When a scaling or normalization operation is to be performed, the system clock is gated to the fast shifter, thus allowing the shift operation to take place in response to the gated clock. Simultaneously, when the shifting operation is taking place, a WAIT signal is provided, telling the microprocessor to postpone action on the next microinstruction until the shifter operation has been completed. The fast shifter is capable of performing either single or double bit shifts to either the right or left, as desired. The fast shifter is also use to implement the parametric shift instructions in the microprocessor instruction set, providing a similar performance enhancement to these operations.

21 Claims, 2 Drawing Sheets

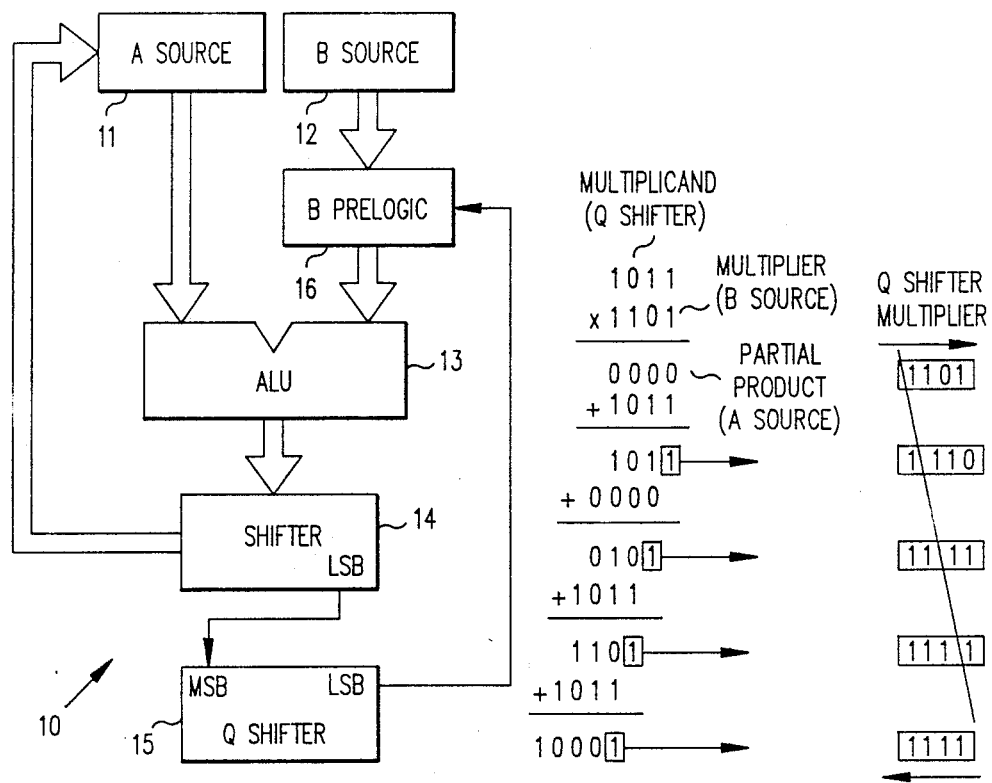
FIG. 1 (prior art)
FIG. 2 (prior art)
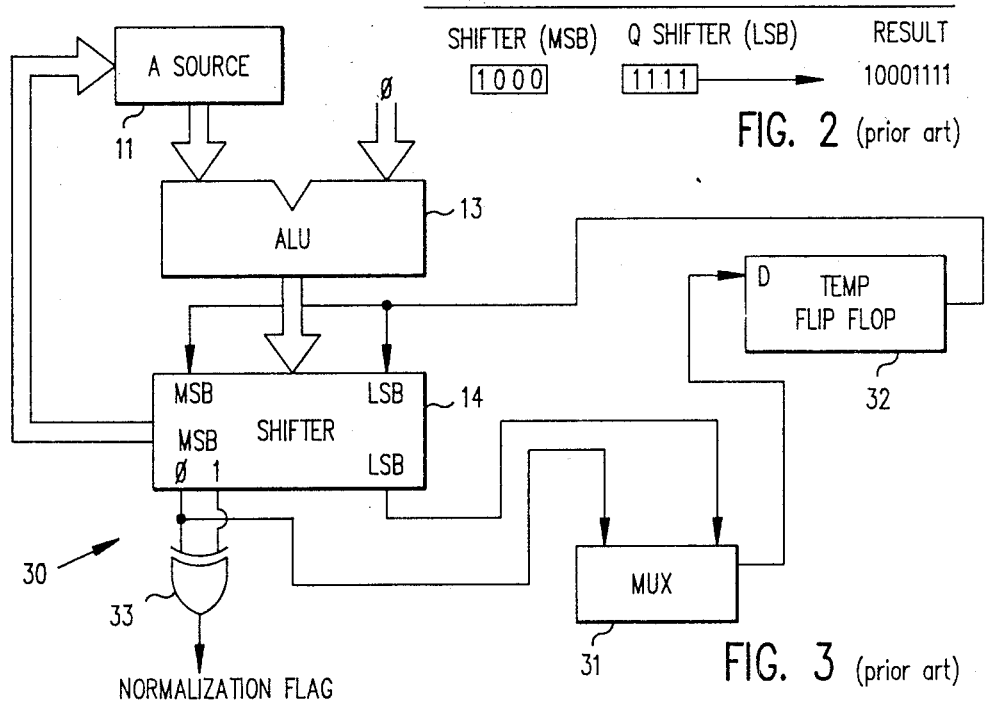
FIG. 3 (prior art)

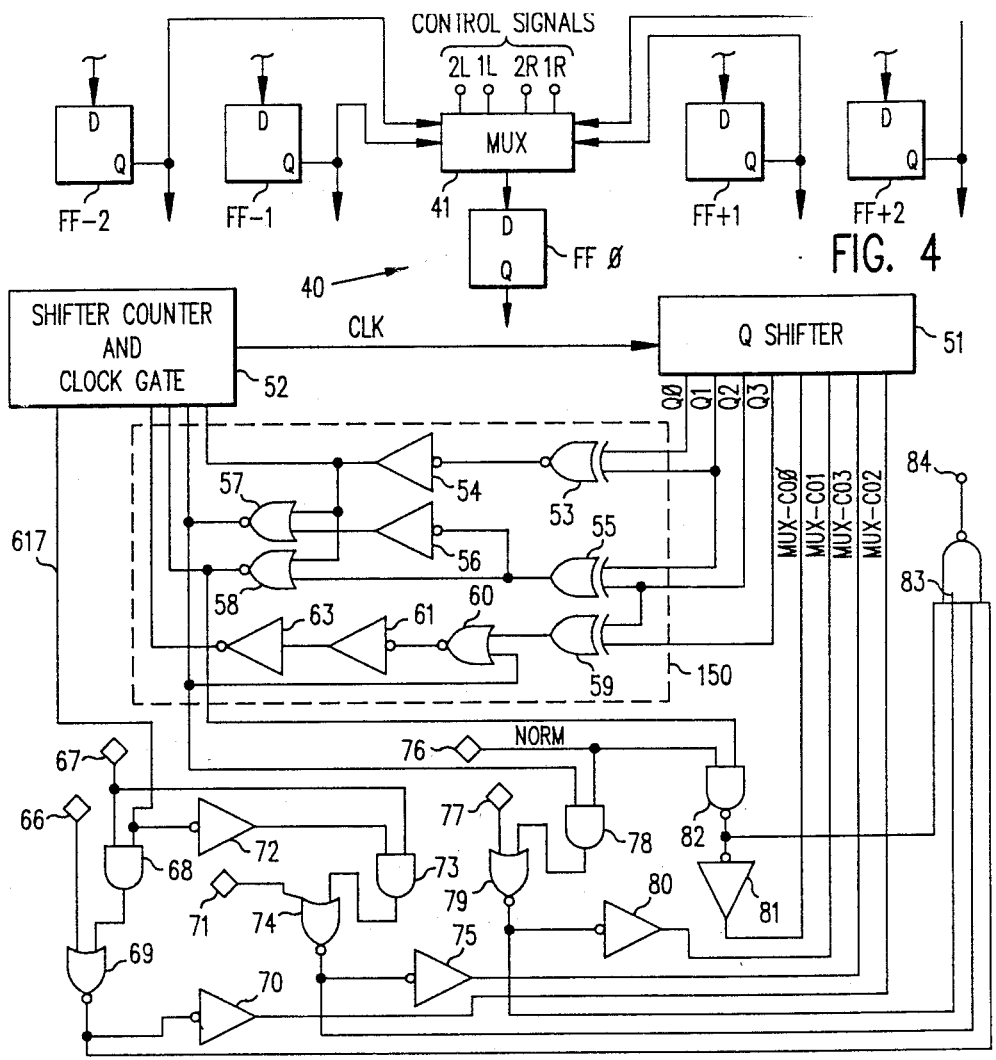
FIG. 4
FIG. 5
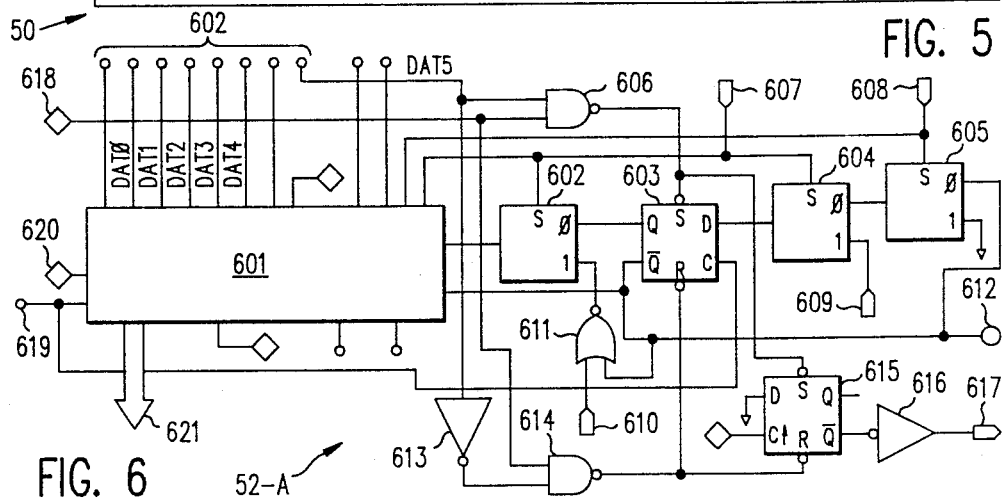
FIG. 6

FAST SHIFTER METHOD AND STRUCTURE

BACKGROUND OF THE INVENTION

This invention relates to electronic circuits and more specifically electronic circuits for use in a microprocessor for performing fast shifting of binary numbers. Fast shifting is essential to the performance of a microprocessor, being a significant part of multiply, divide and floating point operations (specifically in scaling and normalization).

FIG. 1 is a block diagram of a typical prior art multiplication machine 10, as is often found in microprocessors. The A source 11 initially receives 0, and thereafter stores the accumulation of partial products during the multiplication operation. Similarly B source 12 receives the multiplicand, and Q shifter 15 receives the multiplier. In the embodiment described, 16-bit words are multiplied, although it is to be understood that numbers of any length can be multiplied, for example, 8-bit, 32-bit, etc.

The operation of the prior art multiplication machine 10, of FIG. 1, is described with reference to FIG. 2. For the sake of simplicity, two 4-bit numbers are shown in FIG. 2; the binary number 1011 is the multiplicand stored in B source 12, and the binary number 1101 is the multiplier stored in Q shifter 15. In order to multiply two n-bit numbers, the accumulation of n-partial products is required. Thus, as shown in FIG. 2, A source 11 initially receives 0 as an initial partial product, B source 12 receives multiplicand 1011 and Q shifter 15 receives multiplier 1101. Under microcode control, ALU 13 adds the multiplicant stored in B source 12 to the partial product stored in A source 11. The result of the this operation is applied to shifter 14, the least significant bit of the result is applied to the most significant bit of Q shifter 15, and the remaining bits of shifter 14 are applied to A source 11, with the most significant bit of A source 11 receiving a sign extension (i.e., the most significant bit of A source 11 is set equal to the value of the bit to its right). Thus, A source 11 stores the new partial product 0101, and Q shifter 15 stores the multiplier, shifted to the right, and the least significant bit of the partial product.

This operation continues such that the entire multiplication operation is carried out. Prelogic 16 is used to mask (i.e., provide all zeros) the multiplicand when the least significant bit of the multiplier stored in Q shifter 15 during a partial product generation is a logical 0. The reason for this is, obviously, that if the bit of the multiplier by which the multiplicand is being multiplied is 0, 0 must be added to the partial product.

Following the completion of this summation of partial products, Q shifter 15 stores the n least significant bits of the result of the multiplication operation, and A source 11 stores the n most significant bits of the result of the multiplication operation.

As is well known to those of ordinary skill in the art, the operation depicted in FIGS. 1 and 2 can be slightly modified using the so-called modified Booth's algorithm in order to allow operation on 2-bits simultaneously. This reduces the number of partial product generation steps by a factor of 2, although the basic operations depicted in FIGS. 1 and 2 are the same. When using the modified Booth's algorithm, Q shifter 15 is capable of shifting two bits to the right simultaneously. Similarly, the structure of FIG. 1 is commonly used for division, as is well known to those of ordinary skill in the art. During division, Q shifter 15 shifts bits to the left, either one bit position if using the technique described above, or two bit positions if using other algorithms.

TABLE 1

| Scaling Operation | | Normalization Operation | |
|---|---|---|---|
| Step 1 | Shift MSB word to right, make sign extension, and store rightmost MSB. | Step 1 | Shift LSB word to left, fill rightmost LSB with 0, store leftmost LSB. |
| Step 2 | Shift LSB word to right, and carryover stored rightmost MSB to leftmost LSB. | Step 2 | Shift MSB word to left, and carryover stored leftmost LSB to rightmost MSB. |

FIG. 3 shows a block diagram of a portion of a microprocessor configured to perform scaling (adjusting the mantissa of a number such that its exponent will equal the exponent of another number such that the two numbers can be added or subtracted) and normalization (adjusting the mantissa of a number such that its magnitude is between 0.1 and 1.0). Table 1 depicts the two step shifting operation of the structure of FIG. 3 during scaling and normalization of floating point numbers which have a 24 bit mantissa represented by two 16 bit words. A source 11 stores the floating point number for which the scaling or normalization operation is to be performed. For scaling, the exponents of two numbers are substrated and the difference is the amount by which the smaller number must be scaled. With this information available in an exponent difference register (not shown), the mantissa of the number of A source 11 is applied to shifter 14, and shifter 14 shifts the mantissa one bit to the right, and applies the result back to A source 11. Simultaneously, the exponent difference counter (not shown) is decremented to indicate the number of shifts still required in order to properly scale the number now stored in A source 11. This operation continues until the number stored in the exponent difference register is equal to zero. When this occurs, the number stored in A source 11 has been properly scaled. During the operation of shifter 14, when shifting to the right, multiplexer 31 provides the least significant bit of the mantissa being shifted to temporary flip-flop 32, which in turn applies this least significant bit to the most significant bit of shifter 14 during the next operation of shifter 14. Since in floating point operation the mantissa is contained as 16 bits of a first word and 8 bits of a second word, in order to shift a floating point mantissa, two operations of shifter 14 are required for a 16-bit machine, as depicted in Table 1. Similarly, for extended floating point operation, where the mantissa is stored in three words to provide a total of 40 bits, three operations of shifter 14 are required for a 16-bit machine to perform a single shift of the mantissa.

During normalization, a floating point number from A source 11 is normalized by shifting its mantissa to the left until the two most significant bits are different. During this operation, multiplexer 31 selects the most significant bit for storage in temporary flip-flop 32, which then applies this most significant bit to the least significant bit of the next operation of shifter 14. During this normalization operation, a counter (not shown) is incremented in order to reflect the number of left bit shifts performed on the mantissa. Exclusive OR gate 33 compares the two most significant bits of shifter 14 and provides a logical 1 NORMALIZATION FLAG output signal when they are different, indicating that normalization s complete. When normalization is complete, the number reflecting the number of left bit shifts which has taken place is subtracted from the exponent, thereby providing the normalized result.

TABLE 2

| Floating Point Operation | Extended Floating Point Operation |
|---|---|
| Mantissa = 2 16-bit words (24 bits) | Mantissa = 3 16-bit words (40 bits) |
| 2 microcycles per bit shift. | 3 microcycles per bit shift. |
| 23 bit shifts, worst case. | 39 bit shifts, worst case. |
| 1 microcycle = 3 clock cycles. | 1 microcycle = 3 clock cycles. |
| 2 microcycles/bit shift times 23 bit shifts times 3 clock cycles/microcycles | 3 microcycles/bit shift times 39 bit shifts times 3 clock cycles/microcycles |
| Total 138 clock cycles | Total 351 clock cycles |

Table 2 shows the amount of time required for a typical prior art 16 bit microprocessor to perform floating point and extended floating point operations. In floating point operation, the mantissa is represented by 24 bits stored in two 16 bit words. Since the bits of two words must be shifted, two microcycles are required per bit shift. A maximum of 23 bit shifts may be required, for a worst case shift of a 24 bit mantissa. Assuming that a typical microcycle requires 3 clock cycles, this results in, worst case, a total of 138 clock cycles required to perform a 23 bit shift. This is a significant amount of time.

Extended floating point operation is even worse. In extended floating point operation, the mantissa is represented as 40 bits provided by 3 16-bit words. In the worst case, a maximum of 39 bit shifts may be required. This information, together with the fact that there are 3 microcycles per bit shift due to the use of 3 words to represent the mantissa, and assuming a typical microcycle requires 3 clock cycles, results in a total of 351 clock cycles required to perform a 39 bit shift. This is a substantial amount of time in the microprocessor, causing a degradation in the overall throughput of the microprocessor when extended floating point operations are required.

Another technique found in the prior art is the use of a barrel shifter, however this technique is mostly implemented in dedicated floating point coprocessors and is very costly in terms of integrated circuit chip size.

BRIEF DESCRIPTION OF THE DRAWING

FIG. 1 is a block diagram of a prior art microprocessor structure for performing multiplication.

FIG. 2 is a description of a binary multiplication operation, as performed in the structure of FIG. 1.

FIG. 3 is a block diagram of a prior art microprocessor configured to perform scaling and normalization.

FIG. 4 is a block diagram of a portion of the present invention depicting one flip-flop in a chain of flip-flops forming a shift register to be loaded, in a single clock cycle, with the data stored in flip-flops positioned either 1 or 2 bits to the right or left, as desired.

FIG. 5 is a diagram of one embodiment of the present invention which includes logic circuitry to determine whether the shift register should perform a left or right shift of one or two bits.

FIG. 6 is a diagram of one embodiment of a circuit constructed in accordance with the present invention which serves to count the number of bit shifts during the scaling and normalization operations.

SUMMARY

In accordance with the teachings of this invention, normalization and scaling operations are performed by the use of a fast shifter which operates in response to the system clock, rather than microinstructions. This fast shifter is the same shifter used to perform multiply and divide operations, and thus is already present in the microprocessor. In this manner, by local control of the fast shifter, multiple shift steps essential to normalization and scaling operations, are performed at a much faster rate than possible in the prior art wherein each bit shift must be controlled by a single microinstruction, and without the heavy cost in integrated circuit chip area that a barrel shifter requires. In accordance with the teachings of this invention, when a scaling or normalization operation is to be performed, the system clock is gated to the fast shifter, thus allowing the shift operation to take place in response to the gated clock. Simultaneously, when the shifting operation is taking place, a WAIT signal is provided, telling the microprocessor to postpone action on the next microinstruction until the shifter operation has been completed.

In accordance with one embodiment of the present invention, the fast shifter is capable of performing either single or double bit shifts to either the right or left, as desired. This provides the advantage of greater speed of operation.

In one embodiment of this invention, the fast shifter is also used to implement the parametric shift instructions in the microprocessor instruction set, providing a similar performance enhancement to these operations.

DETAILED DESCRIPTION

One embodiment of a shifter capable of performing single bit or double bit right or left shifts is shown in FIG. 4. FIG. 4 shows a plurality of flip-flops, which form a portion of the shifter. FIG. 4 is designed to explain the operation of flip-flop FF-0, and it will be appreciated by those of ordinary skill in the art in light of the teachings of this specification that the actual shift register implemented will be an expansion of the concept depicted in FIG. 4. Flip-flop FF-0, receives a D input signal from multiplexer 41. Multiplexer 41 receives four possible input signals, one from flip-flop FF+1, located one 1 bit position to the right of flip-flop FF-0, another input signal from flip-flop FF+2, located two bit positions to the right of flip-flop FF-0, and also receives input signals from the Q output of flip-flops FF-1 and FF-2, located 1 and 2 bit positions, respectively, to the left of flip-flop FF-0. By application of the appropriate control signals to multiplexer 41, multiplexer 41 selects which output signal from flip-flops FF+1, FF+2, FF-1, and FF-2 for application to flip-flop FF-0 upon application of the gated clock to the flip-flops. Thus, in response to the gated clock signal and the appropriate control signals apply to multiplexer 41, the data stored in flip-flop FF-0 changes such that the data stored in the entire register shifts either one or two bits to the right or left, as desired.

TABLE 3

| | Normalization MSB'S | | | |
|---|---|---|---|---|
| | M0 | M1 | M2 | Operation Required |
| Positive | 0 | 0 | 0 | Need 2 Left Shifts |

TABLE 3-continued

|  | Normalization MSB'S | | | |
|---|---|---|---|---|
|  | M0 | M1 | M2 | Operation Required |
| Number | 0 | 0 | 1 | Need 1 Left Shift |
|  | 0 | 1 | 0 | Normalized |
|  | 0 | 1 | 1 | Normalized |
| Negative | 1 | 0 | 0 | Normalized |
| Number | 1 | 0 | 1 | Normalized |
|  | 1 | 1 | 0 | Need 1 Left Shift |
|  | 1 | 1 | 1 | Need 2 Left Shifts |

FIG. 5 depicts a portion of a microprocessor constructed in accordance with the teachings of this invention which serves to perform shifts, such as are required during scaling and normalization operations, or simply upon request by the microcode. Structure 50 of FIG. 5 includes Q shifter 51 which is constructed in accordance with the teachings of FIG. 4 performing in response to appropriate control signals and a gated clock pulse, a single or double bit shift to the right or left, as desired. Shifter counter and clock gate circuit 52 (shown in more detail in FIG. 6) serves to provide gated clock pulses to Q shifter 51 only when shifting is desired and to inhibit such clock pulses at other times. Also, shifter counter and clock gate circuit 52 serves to count the number of shifts performed, such that the exponent may be adjusted during normalization operations, and to count down the difference in exponents during scaling operations. Subcircuit 150 serves to perform the logical operation depicted in Table 3 during the normalization operation. In accordance with teachings of this invention, it has been determined that by viewing the three most significant bits of the mantissa of the floating point being normalized, it can be determined with certainty whether a single or a double bit shift to the left is required at the is point of the normalization operation. For example, referring to Table 3, for positive numbers, when the most significant bit M0 and the next most significant bit M1 differ, the number has been normalized, regardless of the value of the remainder of the mantissa. When not normalized, if the second and third most significant bits M1 and M2, respectively, are both zeros, at least two left shifts are required to normalize the number, and a double bit shift to the left is performed. Similarly, when not normalized and the second and third most significant bits M1 and M2 are 0 and 1, respectively, only a single left bit shift is required to finally normalize the number. A similar determination can be made with regard to negative numbers, which require a left shift during the normalization process.

TABLE 4

| Floating Point Operation | Extended Floating Point Operation |
|---|---|
| Mantissa = 2 16-bit words (24 bits) | Mantissa = 3 16-bit words (40 bits); |
| one step of one or two bit shifts per clockcycle; two steps of one or two bit shifts possible during the first microcycle of the shift operation | one step of one or two bit shifts per clockcycle; 2 steps of one or two bit shifts possible during the first microcycle of the shift operation. |
| 12 steps of one or two bit shifts, worst case | 20 steps of one or two bit shifts, worst case |
| less 2 steps of bit shifts performed during the first microcycle of the shift operation | less 2 steps of bit shifts performed during the first microcycle of the shift operation |
| 10 steps of bit shifts | 18 steps of bit shifts |
| times 1 required step of bit shifts per clockcycle | times 1 required step of bit shifts per clockcycle |
| 10 clock cycles | 18 clock cycles |
| plus 3 clock cycles from microcycle of the shift operation | plus 3 clock cycles from microcycle of the shift operation |
| Total 13 clock cycles. | Total 21 clock cycles. |

Table 4 depicts the number of clock cycles required to perform floating point operations in accordance with the teachings of this invention. As can be seen, by utilizing the teachings of this invention, a dramatic decrease in the number of clock cycles required to perform floating point operations is achieved as compared with the prior art.

The determination made in accordance with Table 3 is performed by subcircuit 150 of FIG. 5 based upon the values of the three most significant bits M0 through M2 of the number stored in Q shifter 51, in order to provide control signals to Q shifter 51 instructing Q shifter 51 to perform single or double bit shifts in the right or left directions, as required. However, these control signals are applied through additional logic gates. For example, the output signal from NOR gate 57 indicates that a one bit left shift is required. However, this signal is combined by AND gate 78 with a normalization signal applied by the microprocessor to input terminal 76 which indicates that a normalization operation is indeed being performed. The output signal from AND gate 78 is combined in NOR gate 79 with an input signal provided by the microcode to input terminal 77 which indicates that a single bit left shift is required when not in the normalization mode, such as to perform any of the left shift and divide instructions. Thus, Q shifter 51 receives a control signal from the output lead of inverter 80 which indicates that a single left bit shift is required. Similarly, the output signal from NOR gate 58 indicates that a double bit left shift is required. This output signal is gated through AND gate 82 with the normalization signal from input lead 76 to provide a control signal to Q shifter 51 from the output lead of inverter 81 indicating that a double bit left shift is required. The output signal from inverter 54 indicates that the two most significant bits stored in Q shifter 51 differ, and thus that the number stored in Q shifter 51 is normalized. The output signal from inverter 62 indicates that the number stored in Q shifter 51 will be normalized at the end of the next shift operation. This is accomplished by comparing the third and fourth most significant bits stored in Q shifter 51. This is used to indicate to the clock gating unit that this is the last cycle of normalization, so that in the next clock cycle the WAIT signal and the gated clock to the shifter are terminated.

During the scaling operation, the microcode provides a scaling signal on input terminal 67, and a signal from shifter counter and clock gating circuit 52 is applied to AND gate 68. This provides an output signal from AND gate 68 indicating that a single right bit shift is required. NOR gate 69 combines this with a signal from the microcode applied to input terminal 66 indicating that a single right shift is required when not in the scaling operation. This is used, for example, in all the right shift instructions. The output signal from NOR gate 69 is applied to inverter 70, whose output signal is applied to Q shifter 51 indicating that a single right bit shift is required. Similarly, the scaling signal applied to input terminal 67 is applied to one input lead of AND gate 73, whose other input lead receives a signal from inverter 72 indicating that a two bit right shift is required. Thus, the output signal from AND gate 73 indicates that a double right shift is required during the scaling operation. This output signal is combined by NOR gate 74 with a signal from the microcode applied to input terminal 71, which indicates that a double right shift is required, for example during a multiplication operation. The output signal from NOR gate 74 is applied via inverter 75 to Q shifter 51 to indicate when a double right shift is required.

In one embodiment of this invention, the signals applied to Q shifter 51 indicating when single or double bit right or left shifts are required are also applied to NAND gate 83 to provide an output signal on output terminal 84 indicating that no shifts are being performed, and thus the Q shifter can be used for other purposes.

FIG. 6 shows one embodiment of shifter counter 52-A of shifter counter and clock gate circuit 52 of FIG. 5. Input bus 602 receives five bits of data during the scaling operation which is the result of the subtraction of the exponents of the two floating point numbers being compared. The five most significant bits of this number are stored in counter 601, and the sixth most significant bit is stored in flip-flop 603. This data is latched in counter 601 and flip-flop 603 upon receipt of a latch enable signal on input terminal 618. During scaling, if the least significant bit is a logical 1, this indicates that an odd number of shifts are required. In this case, a single right bit shift is performed first, and all subsequent shifts are double right bit shifts. The single bit shift is accomplished as follows. Simultaneously with storing the least significant bit in flip-flop 603, the load pulse on input terminal 618 and the least significant bit of data is applied via NAND gate 614 to the Reset input lead of flip-flop 615. The $\bar{Q}$ output signal of flip-flop 615 is applied via inverter 616 to output terminal 617 (connected to lead 617 of FIG. 5), indicating that a single right bit shift is required. Simultaneously, the logical 1 least significant bit stored in flip-flop 603 provides via multiplexer 602 a disable signal to counter 601, thereby causing counter 601 to retain the five most significant bits as is. A scale operation signal is applied to input terminal 608, thus causing multiplexer 605 to output a logical 0 signal, which in turn is applied via multiplexer 604 to flip-flop 603 when latched by the clock signal applied to input lead 619. At this time, the data stored in flip-flop 603 is set to a logical 0, and the operation of counter 601 is enabled. From this point on during the scaling operation, flip-flop 603 has no effect. Since counter 601 stores all but the least significant bit of the number of shifts to be performed during the scaling operation, counter 601 stores a 5 it number indicating the number of double bit right shifts required during the scaling operation. Thus, with each clock cycle, counter 601 decrements its count by one, and provides an output signal on output lead 622 indicating to the clock gating logic when the counter is about to terminate, thus causing the WAIT signal and the gated clock to become inactive in the next clock cycle.

Scaling counter 601 of FIG. 6 is also used during the normalization operation to count the number of shifts which have taken place in order to cause the number to be normalized. This information is then used by the microprocessor in order to adjust the exponent of the normalized number such that the overall value of the normalized number does not change. During the normalization operation, input terminals 609 and 610 receive from circuit 50 of FIG. 5, signals indicating that a one bit left shift and a two bit left shift, respectively, have been performed. The microprocessor provides a logical 1 on input terminal 607 indicating that a normalization operation is being performed, and a logical 0 on input terminal 608 indicating that a scaling operation is not being performed, thereby enabling the "1" input terminals of multiplexers 602 and 604 to receive the input signals on input terminals 610 and 609, respectively. Upon receipt of a clock signal on input terminal 619, counter 601 and flip-flop 603 work as a single unit. Flip-flop 603 counts a single shift step if the input signal to lead 609 is active and counter 601 counts all the double shift steps when the signal on input lead 610 is active. Following completion of the normalization operation, the output data stored in counter 601 and flip-flop 603 is available on output bus 621 for use in adjusting the exponent of the normalized number.

The specific embodiments of this invention described in this specification are intended to serve by way of example and are not a limitation on the scope of the invention. Numerous other embodiments of this invention will become apparent to those of ordinary skill in the art of light of the teachings of this specification.

We claim:

1. A method of normalizing a floating point number having an exponent and a mantissa comprising the steps of:
   (a) determining from the N most significant bits of the mantissa, where N is an integer less than a length of the mantissa and greater than 2, whether said floating point number is either normalized or requires from 1 to N−1 bit shifts;
   (b) performing said 1 to N−1 bit shifts of the mantissa in a single clock cycle
   (c) performing steps (a) and (b) until said floating point number is normalized; and
   counting the number of bit shifts performed in steps (b) and (c).

2. The method as in claim 1 wherein said floating point number is stored in a shift means capable of performing from 1 to N−1 bit shifts in a single clock cycle.

3. The method as in claim 1 wherein M bit shifts, where $0 < M < P-1$, are required where P is the length of the mantissa.

4. The method as in claim 1 wherein N=3.

5. The method as in claim 1 wherein the exponent of said floating point number is adjusted in an amount equal to the number of bit shifts performed.

6. The method of claim 1 wherein a WAIT signal is generated during normalization and said WAIT signal is disabled when said floating point number is normalized.

7. The method of claim 6 wherein said WAIT signal is used by a central processing unit to suspend operation until said floating point number is normalized.

8. The method as in claim 1, wherein steps a, b, and c are all performed in one shift register.

9. The method of claim 1 wherein the shift operation is performed in response to a clock signal which is disabled when said floating point number is normalized.

10. A structure for normalizing a floating point number having an exponent and a mantissa comprising:
    shifter means for storing said floating point number, capable of performing from 1 to N−1 bit shifts in a single clock cycle, where N is an integer less than a length of the mantissa and greater than 2;

means for analyzing the N most significant bits of the mantissa of the floating point number and providing central signals to said shifter means to cause from 1 to N−1 bit shifts of the mantissa if said floating point number is not normalized; and a shift counter for counting the number of bit shifts performed during the normalization of said floating point number.

11. The structure of claim 10 wherein said means for analyzing provides said control signals indicating that M bit shifts, where $O<M<P-1$, are required when the M+1 most significant bits of the mantissa of said floating point number are identical to each other, where P is the length of the mantissa.

12. The structure of claim 10 wherein N=3.

13. The structure of claim 10 further comprising means for generating a WAIT signal during normalization which is disabled when said floating point number is normalized.

14. The structure of claim 13 further comprising a central processing unit, the operation of said central processing unit being suspended in response to said WAIT signal until said floating point number is normalized.

15. The structure of claim 10 wherein said sift means shifts in response to a clock signal which is disabled when said floating point number is normalized.

16. A method of scaling a floating point number having an exponent and a mantissa comprising the steps of;
determining the number of bit shifts required on the mantissa;
performing a single bit shift on the mantissa if the number of bit shifts required is odd; and
performing double bit shifts on the mantissa until no further bit shifts are required.

17. The method of claim 16 wherein each said single bit shift and double bit shift is performed in a single clock cycle.

18. The method as in claim 16, further comprising the step of counting the number of bit shifts performed in the other steps.

19. The method of claim 16, wherein all the steps are performed in a single processing step.

20. A structure for scaling a floating point number having an exponent and a mantissa comprising:
shift means for performing one or two bit shifts on the mantissa of said floating point number;
a scaling counter for storing the number of bit shifts required for scaling the number;
means for providing a first control signal to said shift means in response to the least significant bit of said scaling counter, indicating that a single bit shift is required;
means for disabling said scaling counter in response to said least significant bit of said scaling counter;
means for resetting said least significant bit of said scaling counter when said single bit shift is performed; and
means for causing said scaling counter to decrement its count by two and provide a count and signal to said shift means, indicating that a double bit shift is required.

21. The structure as in claim 20 wherein said scaling counter comprises a single bit register for storing said least significant bit of said scaling counter and a counter for storing the remaining bits of said scaling counter.

* * * * *